US009593227B2

(12) United States Patent
Shigeta et al.

(10) Patent No.: US 9,593,227 B2
(45) Date of Patent: Mar. 14, 2017

(54) RUBBER COMPOSITION AND MOLDED PRODUCT

(71) Applicant: ZEON CORPORATION, Chiyoda-ku, Tokyo (JP)

(72) Inventors: Masahiro Shigeta, Tokyo (JP); The Ban Hoang, Tokyo (JP); Mitsugu Uejima, Tokyo (JP)

(73) Assignee: ZEON CORPORATION, Chiyoda-ku, Tokyo (JP)

( * ) Notice: Subject to any disclaimer, the term of this patent is extended or adjusted under 35 U.S.C. 154(b) by 0 days.

(21) Appl. No.: 14/652,908

(22) PCT Filed: Dec. 18, 2013

(86) PCT No.: PCT/JP2013/007446
§ 371 (c)(1),
(2) Date: Jun. 17, 2015

(87) PCT Pub. No.: WO2014/097626
PCT Pub. Date: Jun. 26, 2014

(65) Prior Publication Data

US 2015/0329693 A1 Nov. 19, 2015

(30) Foreign Application Priority Data

Dec. 21, 2012 (JP) ................................ 2012-279111

(51) Int. Cl.
*C08L 9/02* (2006.01)
*C08K 3/04* (2006.01)
*C08K 7/24* (2006.01)

(52) U.S. Cl.
CPC .................. *C08K 3/04* (2013.01); *C08K 7/24* (2013.01); *C08L 9/02* (2013.01); *C08K 2003/045* (2013.01); *C08K 2201/001* (2013.01); *C08K 2201/011* (2013.01)

(58) Field of Classification Search
CPC .................................. C08K 3/04; C08L 9/02
See application file for complete search history.

(56) References Cited

U.S. PATENT DOCUMENTS

| | | | | |
|---|---|---|---|---|
| 2007/0299200 | A1* | 12/2007 | Kobayashi | C08K 3/04 524/555 |
| 2008/0318049 | A1 | 12/2008 | Hata et al. | |
| 2009/0011318 | A1* | 1/2009 | Sasaki | B82Y 30/00 429/514 |
| 2009/0297846 | A1* | 12/2009 | Hata | B01J 20/20 428/367 |
| 2013/0261246 | A1 | 10/2013 | Ong et al. | |
| 2014/0353556 | A1 | 12/2014 | Shigeta et al. | |

FOREIGN PATENT DOCUMENTS

| | | | |
|---|---|---|---|
| CN | 101010260 | A | 8/2007 |
| CN | 101691437 | A | 4/2010 |
| CN | 103946316 | A | 7/2014 |
| EP | 1787955 | A1 | 5/2007 |
| EP | 2787044 | A1 | 10/2014 |
| JP | 2004-301171 | A | 10/2004 |
| JP | 2010-001475 | A | 1/2010 |
| JP | 2010-059227 | A | 3/2010 |
| WO | 2006/011655 | A1 | 2/2006 |

OTHER PUBLICATIONS

Jun. 23, 2015 International Preliminary Report on Patentability issued in International Patent Application No. PCT/JP2013/007446.
Jan. 21, 2014 International Search Report issued in International Patent Application No. PCT/JP2013/007446.
Jan. 11, 2016, Office Action issued by the State Intellectual Property Office in the corresponding Chinese Patent Application No. 201380066200.0.
Jun. 13, 2016, the Extended European Search Report issued by the European Patent Office in the corresponding European Application No. 13863995.0.
Zeon Corporation: "Special Rubber Zetpol", Apr. 22, 2003, XP002758266, Retrieved from the Internet: URL: http://www.zeon.co.jp/business_e/enterprise/rubber/rubber__hnbr.html [retrieved on May 31, 2016] * p. 3 *.

* cited by examiner

*Primary Examiner* — Vu A Nguyen
(74) *Attorney, Agent, or Firm* — Kenja IP Law PC

(57) ABSTRACT

A rubber composition having extremely high electrical conductivity is provided. The rubber composition contains nitrile rubber (A) having an $\alpha,\beta$-ethylenic unsaturated nitrile monomer unit and an iodine value of 100 or lower, and carbon nanotubes (B) having the average diameter (Av) and diameter distribution ($3\sigma$) that satisfy the following relational expression: $0.60>3\sigma/Av>0.20$.

3 Claims, No Drawings

RUBBER COMPOSITION AND MOLDED PRODUCT

TECHNICAL FIELD

The disclosure relates to a rubber composition containing nitrile rubber and carbon nanotubes, and a molded product using the rubber composition.

BACKGROUND

A composition obtained by blending a crosslinking agent and carbon nanotubes (hereinafter frequently referred to as "CNTs") into hydrogenated carboxylated nitrile rubber that has heat, ozone, chemical, and oil resistances is conventionally known, as described for example in Patent Literature 1 (PTL 1). A vulcanized material obtained by vulcanizing a composition described in Patent Literature 1 has higher tensile strength and elastic modulus while maintaining elongation at break and strain characteristics.

CNTs are now attracting attention as carbon materials that effectively improve electrical conductivity and mechanical characteristics. The rubber composition containing a rubber component and carbon nanotubes are thus attracting attention as a material having superior electrical conductivity and mechanical characteristics.

CITATION LIST

Patent Literature

PTL 1: JP 2010-001475 A (corresponding to US 2013/0261246 A)

It could be helpful to provide a rubber composition having extremely high electrical conductivity while maintaining rubber flexibility.

SUMMARY

According to the disclosure, provided is a rubber composition containing nitrile rubber (A) having an α,β-ethylenic unsaturated nitrile monomer unit and an iodine value of 100 or lower, and carbon nanotubes (B) having an average diameter (Av) and diameter distribution (3σ) that satisfy the following relational expression: $0.60>3\sigma/Av>0.20$.

The preferred content of the α,β-ethylenic unsaturated nitrile monomer unit in the nitrile rubber (A) is 15-60% by mass of the total monomer units.

The preferred amount of the carbon nanotubes (B) per 100 parts by mass of the nitrile rubber (A) is 0.01-10 parts by mass.

Further according to the disclosure, a molded product made of the above-described rubber composition is provided.

DETAILED DESCRIPTION

Embodiments of the disclosure will be specifically described below. The embodiments are however in no way limiting.

(Rubber Composition)

The rubber composition of the embodiments contains prescribed nitrile rubber (A) and prescribed carbon nanotubes (B). The rubber composition optionally contains a plasticizer, thermoplastic resin, a crosslinking agent, or other additives.

<Nitrile Rubber (A)>

The nitrile rubber (A) is required to have a structural unit derived from an α,β-ethylenic unsaturated nitrile monomer (i.e., an α,β-ethylenic unsaturated nitrile monomer unit) and an iodine value of 100 or lower.

In this regard, the nitrile rubber (A) generally further contains, in addition to the structural unit derived from an α,β-ethylenic unsaturated nitrile monomer, a structural unit derived from a diene monomer (i.e., a diene monomer unit) and/or a structural unit derived from an α-olefin monomer (i.e., an α-olefin monomer unit). The nitrile rubber (A) containing the diene monomer unit and/or the α-olefin monomer unit would provide sufficient rubber elasticity to a crosslinked rubber material obtained by crosslinking the rubber composition.

The nitrile rubber (A) is obtained by hydrogenating a nitrile rubber (a) and adjusting the iodine value to 100 or lower. The nitrile rubber (a) has been prepared by copolymerizing for example an α,β-ethylenic unsaturated nitrile monomer, a diene monomer and/or α-olefin monomer, and optionally other monomers copolymerizable with the above-mentioned monomers. A commercially-available hydrogenated nitrile rubber may also be used as the nitrile rubber (A).

[α,β-Ethylenic Unsaturated Nitrile Monomer]

The monomer forming the α,β-ethylenic unsaturated nitrile monomer unit may be any α,β-ethylenic unsaturated compound that has a nitrile group. Specifically, examples of the α,β-ethylenic unsaturated nitrile monomer include acrylonitrile; α-halogeno acrylonitrile, such as α-chloro acrylonitrile, and α-bromoacrylonitrile; and α-alkyl acrylonitrile, such as methacrylonitrile. Of these α,β-ethylenic unsaturated nitrile monomers, acrylonitrile and methacrylonitrile are preferred. These monomers may be used in combination.

The content of the α,β-ethylenic unsaturated nitrile monomer unit in the nitrile rubber (A) (hereinafter frequently referred to as "nitrile content") is preferably in the range of 15 to 60% by mass, further preferably in the range of 25 to 55% by mass, and particularly preferably in the range of 25 to 50% by mass, of the total monomer units. The nitrile content in the above ranges effectively reform the rubber composition to be obtained, which would impart high conductivity even if carbon nanotubes were added in a small amount.

The nitrile content may be adjusted by changing the amount of the α,β-ethylenic unsaturated nitrile monomer used in the polymerization. The content of the α,β-ethylenic unsaturated nitrile monomer unit in the nitrile rubber (A) may be quantitated in accordance with the mill oven method of JIS K 6364, in which the amount of the nitrogen generated is measured to calculate the bonding amount thereof from the molecular weight of acrylonitrile.

[Diene Monomer]

Examples of the monomer forming the diene monomer unit include conjugated dienes having a carbon number of 4 or greater, such as 1,3-butadiene, isoprene, 2,3-dimethyl-1,3-butadiene, and 1,3-pentadiene; and non-conjugated dienes having a carbon number of 5 to 12, such as 1,4-pentadiene and 1,4-hexadiene. Of these diene monomers, conjugated dienes are preferred, and 1,3-butadiene is more preferred. These monomers may also be used in combination.

[α-Olefin Monomer]

Examples of the monomer forming the α-olefin monomer unit preferably include olefins having a carbon number of 2 to 12. Specifically, the α-olefin monomer may be ethylene, propylene, 1-butene, 4-methyl-1-pentene, 1-hexene, or 1-octene. These monomers may also be used in combination.

[Other Monomers]

Examples of other monomers copolymerizable with the above-described monomers (i.e., α,β-ethylenic unsaturated nitrile monomer, and diene monomer and/or α-olefin monomer) include an α,β-ethylenic unsaturated carboxylic acid ester monomer, an aromatic vinyl monomer, a fluorine-containing vinyl monomer, a cationic monomer, and copolymerizable antioxidant.

Examples of the α,β-ethylenic unsaturated carboxylic acid ester monomer include (meth)acrylic acid alkyl ester, such as methyl acrylate, ethyl acrylate, propyl acrylate, butyl acrylate, n-dodecyl acrylate, methyl methacrylate, and ethyl methacrylate, wherein the carbon number of the alkyl group is 1 to 18; (meth)acrylic acid alkoxyalkyl ester, such as methoxymethyl acrylate and methoxyethyl methacrylate, wherein the carbon number of the alkoxyalkyl group is 2 to 12; (meth)acrylic acid cyanoalkyl ester, such as α-cyanoethyl acrylate, β-cyanoethyl acrylate, and cyanobutyl methacrylate, wherein the carbon number of the cyanoalkyl group is 2 to 12; (meth)acrylic acid hydroxyalkyl ester, such as 2-hydroxyethyl acrylate, 2-hydroxyethyl methacrylate, and 3-hydroxypropyl acrylate, wherein the carbon number of the hydroxy alkyl group is 1 to 12; fluorine-substituted benzyl group-containing (meth)acrylic acid ester, such as fluorobenzyl acrylate and fluorobenzyl methacrylate; fluoroalkyl group-containing (meth)acrylic acid ester, such as trifluoroethyl acrylate and tetrafluoropropyl methacrylate; unsaturated polyvalent carboxylic acid polyalkyl ester, such as dimethyl maleate, dimethyl fumarate, dimethyl itaconate, and diethyl itaconate; and amino group-containing α,β-ethylenic unsaturated carboxylic acid ester, such as dimethylaminomethyl acrylate and diethylaminoethyl acrylate.

The term "(meth)acrylic acid" as used herein refers to "acrylic acid and/or methacrylic acid".

Examples of the aromatic vinyl monomer include styrene, α-methyl styrene, and vinylpyridine.

Examples of the fluorine-containing vinyl monomer include fluoroethyl vinyl ether, fluoropropyl vinyl ether, o-trifluoromethyl styrene, pentafluoro vinyl benzoate, difluoro ethylene, and tetrafluoro ethylene.

Examples of the cationic monomer include (meth)acryloyl oxyhydroxypropyltrimethyl ammonium chloride, (meth)acryloyl oxytriethyl ammonium chloride, and (meth) acryloyl oxydimethylbenzyl ammonium chloride.

The term "(meth)acryloyl" as used herein refers to "acryloyl and/or methacryloyl".

Examples of the copolymerizable antioxidant include N-(4-anilinophenyl)acrylamide, N-(4-anilinophenyl)methacrylamide, N-(4-anilinophenyl)cinnamamide, N-(4-anilinophenyl)crotonamide, N-phenyl-4-(3-vinyl benzyloxy)aniline, and N-phenyl-4-(4-vinyl benzyloxy)aniline.

These other copolymerizable monomers may be used in combination. The content of the above-described other monomer unit contained in the nitrile rubber (A) is preferably 40% by mass or less, more preferably 30% by mass of less, further preferably 20% by mass or less, and particularly preferably 10% by mass or less, based on the total monomer units.

[Method of Manufacturing Nitrile Rubber (A)]

The nitrile rubber (A) used in the embodiments may be manufactured by copolymerizing monomers constituting the nitrile rubber (A) and then hydrogenate the resultant. The monomers may be copolymerized by any method, preferably such as emulsion polymerization and suspension polymerization (including fine suspension polymerization). The emulsion polymerization provides latex of a copolymer having an average particle diameter of about 50 to 1000 nm using an emulsifier such as sodium dodecylbenzenesulfonate. The suspension polymerization provides a water dispersion liquid of a copolymer having an average particle diameter of about 0.2 to 200 μm using a dispersant such as polyvinyl alcohol. Of these methods, emulsion polymerization is more preferred, in which polymerization reaction can be easily controlled.

By way of example, copolymerization of the monomers with emulsion polymerization will be described below.

-Copolymerization with Emulsion Polymerization-

The amount of the emulsifier used is preferably in the range of 1 to 10 parts by mass, more preferably in the range of 1 to 5 parts by mass, and particularly preferably in the range of 1.5 to 3.0 parts by mass, per 100 parts by mass of the total monomers. When the amount of the emulsifier used is in excess, the amount of methanol extraction from the nitrile rubber (A), i.e., the amount of impurities, would increase. Conversely, when the amount of the emulsifier used is too small, the stability of the latex would decrease, which may possibly terminate the reaction of the emulsion polymerization.

In the emulsion polymerization, subsidiary materials for polymerization, which are conventionally and publicly known, may be used other than the emulsifier. Examples of the subsidiary material include polymerization initiator and molecular weight modifier. The subsidiary materials can be added by any method; they may be collectively added at the outset of the polymerization, may be added in batches, or may be added in series.

The polymerization initiator may be any radical initiator. Specific examples of the polymerization initiator include inorganic peroxides, such as potassium persulfate, sodium persulfate, ammonium persulfate, potassium superphosphate, and hydrogen peroxide; organic peroxides, such as t-butylperoxide, cumene hydroperoxide, p-menthane hydroperoxide, di-t-butyl peroxide, t-butylcumyl peroxide, acetyl peroxide, isobutyryl peroxide, octanoyl peroxide, dibenzoyl peroxide, 3,5,5-trimethylhexanoyl peroxide, t-butyl peroxy isobutylate; and azo compounds, such as azobisisobutyronitrile, azobis-2,4-dimethylvaleronitrile, azobiscyclohexanecarbonitrile, and azobisisomethyl butyrate. These polymerization initiators may be used alone or in combination of at least two thereof. Inorganic or organic peroxides are preferred as the polymerization initiator.

If a peroxide is used as the polymerization initiator, the peroxide may be combined with a reductant such as sodium bisulfite and ferrous sulfate, and can be used as a redox polymerization initiator.

The amount of the polymerization initiator used is preferably in the range of 0.01 to 2 parts by mass, more preferably in the range of 0.05 to 1.5 parts by mass, per 100 parts by mass of the total monomers.

The molecular weight modifier may be, but not limited to, mercaptans, such as t-dodecyl mercaptan, n-dodecyl mercaptan, and octyl mercaptan; halogenated hydrocarbon, such as carbon tetrachloride, methylene chloride, and methylene bromide; α-methyl styrene dimer; or sulfur-containing compounds, such as tetraethylthiuram disulfide, dipentamethylenethiuram disulfide, and diisopropyl xanthogen disulfide. These may be used alone or in combination of at least two thereof. Of these molecular weight modifiers, mercaptans are preferred, and t-dodecyl mercaptan is more preferred.

The amount of the molecular weight modifier used is preferably in the range of 0.1 to 0.8 parts by mass, and more preferably in the range of 0.2 to 0.7 parts by mass, per 100 parts by mass of the total monomers.

The typical medium of the emulsion polymerization is water. The amount of the water is preferably in the range of 80 to 500 parts by mass, and more preferably in the range of 100 to 300 parts by mass, per 100 parts by mass of the total monomers.

In emulsion polymerization, other subsidiary materials, such as a chelating agent, a dispersant, a pH modifier, a deoxidant, a particle diameter modifier, may further be used as necessary. When used, these additional materials may be any kind and may be used in any amount.

-Hydrogenation of Copolymer-

The copolymer obtained by the copolymerization of the monomers (i.e., nitrile rubber (a)) may be hydrogenated by any method that is publicly known. For example, an oil-layer hydrogenation method or a water-layer hydrogenation method may be employed. Of these methods, the oil-layer hydrogenation method is preferred, which can reduce the amount of methanol extraction (the amount of impurities) from the nitrile rubber (A) to be obtained by hydrogenating the nitrile rubber (a).

In manufacturing the nitrile rubber (A), the oil-layer hydrogenation method is performed in the following manner.

First, the latex of the nitrile rubber (a), which has been prepared by emulsion polymerization, is salted-out to be coagulated, and filtered and dried to be formed into a coagulated material of the nitrile rubber (a). The coagulated material is then dissolved in an organic medium. The nitrile rubber (a) dissolved in the organic medium is then subjected to hydrogenation reaction (oil layer hydrogenation) to obtain a hydrogenated material, or specifically the nitrile rubber (A). If the organic solvent is water-soluble solvent, such as acetone, the hydrogenated material obtained is poured into large amounts of water, and the material is coagulated and filtered/dried to be formed into the nitrile rubber (A).

In the coagulation in which the latex is salted-out, any publicly-known coagulant, such as sodium chloride, calcium chloride, aluminum sulfate, magnesium sulfate, magnesium chloride, and magnesium nitrate, may be used. Of the coagulants, magnesium salts, such as magnesium sulfate, magnesium chloride, and magnesium nitrate, are preferred, which even further reduces the extraction amount of methanol from the nitrile rubber (A). The amount of the coagulant used is preferably in the range of 1 to 100 parts by mass, more preferably in the range of 5 to 50 parts by mass, and particularly preferably in the range of 10 to 50 parts by mass, given that the amount of the nitrile rubber (a) to be hydrogenated is 100 parts by mass. The coagulation temperature is preferably 10 to 80° C.

The organic solvent used in the oil-layer hydrogenation method may be any liquid organic compound that dissolves the nitrile rubber (a). The preferred organic solvent used may be benzene, toluene, xylene, hexane, cyclohexane, tetrahydrofuran, methyl ethyl ketone, ethyl acetate, cyclohexanone, or acetone.

The catalyst used in the hydrogenation reaction of the oil-layer hydrogenation method may be any selective hydrogenation catalyst publicly known. Specifically, the preferred catalyst used in the hydrogenation reaction may be a palladium-based catalyst or rhodium-based catalyst. The palladium-based catalyst (such as palladium acetate, palladium chloride, and palladium hydroxide) is more preferred. These catalysts may be used in combination of at least two thereof. If the combination of the rhodium-based catalyst and palladium-based catalyst is used, the preferred main active component is the palladium-based catalyst. The above-described catalysts are generally supported by a carrier when used. Examples of the carrier may include silica, silica-alumina, alumina, diatomite, and active carbon. The amount of the catalyst used is preferably in the range of 10 to 5000 ppm by mass, and more preferably in the range of 100 to 3000 ppm by mass, based on the amount of the nitrile rubber (a) to be hydrogenated.

The temperature of the hydrogenation reaction in the oil-layer hydrogenation method is preferably in the range of 0 to 200° C., and more preferably in the range of 10 to 100° C. The hydrogen pressure in the hydrogenation reaction is preferably in the range of 0.1 to 30 MPa, and more preferably in the range of 0.2 to 20 MPa. The reaction time is preferably in the range of 1 to 50 hours, and more preferably in the range of 2 to 25 hours.

Alternatively, the nitrile rubber (A) may be manufactured by water-layer hydrogenation method. In such a case, the latex of the nitrile rubber (a), prepared by emulsion polymerization, is diluted with water as necessary, before being subjected to hydrogenation reaction.

The water-layer hydrogenation method includes (I) water-layer direct hydrogenation method and (II) water-layer indirect hydrogenation method. In the method (I), hydrogen is supplied to a reaction system in the presence of a hydrogenation catalyst, and the target material (i.e., nitrile rubber (a)) is hydrogenated. In the method (II), the target material is reduced in the presence of an oxidant, a reductant, and an activator to be hydrogenated.

In the water-layer direct hydrogenation method (I), the concentration of the nitrile rubber (a) in the water layer (i.e., the concentration in the form of latex) is preferably 40% by mass or less to prevent aggregation.

The hydrogenation catalyst used in the water-layer direct hydrogenation method may be any compound which would not decompose in water. Specific examples of the palladium-based hydrogenation catalyst include palladium salts of carboxylic acid, such as formic acid, propionic acid, lauric acid, succinic acid, oleic acid, and phthalic acid; chlorinated products of palladium, such as palladium chloride, dichloro (cyclooctadiene) palladium, dichloro (norbornadiene) palladium, and ammonium hexachloropalladate(IV); iodinated products of palladium, such as palladium iodide; and palladium sulfate dihydrate. Of these, palladium salts of carboxylic acid, dichloro (norbornadiene) palladium, and ammonium hexachloropalladate(IV) are particularly preferred. The amount of the hydrogenation catalyst used, which can be determined as appropriate, is preferably in the range of 5 to 6000 ppm by mass, and more preferably in the range of 10 to 4000 ppm by mass, based on the amount of the nitrile rubber (a) to be hydrogenated.

The reaction temperature in the water-layer direct hydrogenation method is preferably in the range of 0 to 300° C., more preferably in the range of 20 to 150° C., and particularly preferably in the range of 30 to 100° C. An excessively low temperature may decrease the reaction rate, and conversely, an excessively high temperature may cause side reactions such as hydrogenation of a nitrile group. The pressure of the hydrogen to be supplied is preferably in the range of 0.1 to 30 MPa, and more preferably in the range of 0.5 to 20 MPa. The reaction time is determined based on the reaction temperature, hydrogen pressure, a targeted hydrogenation rate, and the like.

In the water-layer direct hydrogenation method, the hydrogenation catalyst in the latex is removed at the end of the reaction. The removal may be performed by adding an adsorbent, such as active carbon or ion-exchange resin, to the latex in a stirred state to allow the adsorbent to absorb the hydrogenation catalyst, followed by filtering and centrifuging of the latex. Alternatively, the hydrogenation catalyst may not be removed and left in the latex.

In the water-layer indirect hydrogenation method (II), the concentration of the nitrile rubber (a) in the water layer (i.e., the concentration of the nitrile rubber (a) in the form of latex) is preferably in the range of 1 to 50% by mass, and more preferably in the range of 1 to 40% by mass.

Examples of the oxidant used in the water-layer indirect hydrogenation method include oxygen, air, and hydrogen peroxide. The amount of the oxidant used is preferably in the range of 0.1:1 to 100:1, and more preferably in the rage of 0.8:1 to 5:1, in terms of the mole ratio with respect to the carbon-carbon double bond of the nitrile rubber (a) (i.e., oxidant:carbon-carbon double bond).

Examples of the reductant used in the water-layer indirect hydrogenation method include hydrazines, such as hydrazine, hydrazine hydrate, hydrazine acetate, hydrazine sulfate, and hydrazine chloride; and compounds that free hydrazine. The amount of the reductant used is preferably in the range of 0.1:1 to 100:1, and more preferably in the range of 0.8:1 to 5:1, in terms of the mole ratio with respect to the carbon-carbon double bond of the nitrile rubber (a) (i.e., reductant:carbon-carbon double bond).

Examples of the activator used in the water-layer indirect hydrogenation method include ions of metals, such as copper, iron, cobalt, lead, nickel, and tin. The amount of the activator used is preferably in the range of 1:1000 to 10:1, and more preferably in the range of 1:50 to 1:2, in terms of the mole ratio with respect to the carbon-carbon double bond (i.e., activator:carbon-carbon double bond).

The hydrogenation reaction in the water-layer indirect hydrogenation method is performed by heating the reaction system at a temperature ranging from 0° C. to a reflux temperature. The heating temperature of the above procedure is preferably in the range of 0 to 250° C., more preferably in the range of 20 to 100° C., and particularly preferably in the range of 40 to 80° C.

In both of the water-layer direct hydrogenation method and the water-layer indirect hydrogenation method, hydrogenation is preferably followed by coagulation with salting-out, filtering, and drying. In the salting-out, similarly to the salting-out of the latex in the oil-layer hydrogenation method, the above-mentioned magnesium salts are preferably used to further reduce the amount of methanol extraction from the nitrile rubber (A). The filtering and drying steps of the hydrogenated material (i.e., nitrile rubber (A)), following the coagulation step, can be performed with any publicly-known method.

<Carbon Nanotubes (CNTs)>

The carbon nanotubes used in the embodiments have an average diameter (Av) and the diameter distribution (3σ) that satisfy the following relational expression: $0.60>3\sigma/Av>0.20$.

"Diameter distribution (3σ)" used herein refers to the value obtained by multiplying the standard deviation (σ) of the diameters of the carbon nanotubes by three. "Average diameter (Av)" and "standard deviation (σ)" are each obtained by measuring the diameters (outside diameters) of 100 randomly-selected carbon nanotubes using a transmission electron microscope.

The CNTs having the average diameter (Av) and the diameter distribution (3σ) that satisfy the relational expression $0.60>3\sigma/Av>0.20$ provide a rubber composition that exhibits superior electrical conductivity, even if the CNTs are contained in a small amount. Considering the characteristics of the rubber composition to be obtained, the preferred ratio of the diameter distribution to the average diameter (i.e., 3σ/Av) is greater than 0.25, more preferably greater than 0.50.

The greater the value, the wider the diameter distribution of the CNTs. In the CNTs of the embodiments, the preferred diameter distribution is normal distribution. The value of the diameter distribution may be increased by combining multiple types of CNTs each obtained by a different method. In such a case, however, normal distribution would not be readily obtained. This means that the preferred CNTs used in the embodiments is made of a single type of CNTs or of the combination of the single type of CNTs and other types of CNTs in an amount that do not affect the diameter distribution of the single type of CNTs.

[Properties of CNTs]

The preferred average diameter (Av) of the CNTs is 0.5 nm or more, more preferably 1 nm or more, but preferably 15 nm or less, more preferably 10 nm or less, to impart high electrical conductivity to the rubber composition.

The CNTs used in the embodiments preferably have a radial breathing mode (RBM) peak in Raman spectroscopy. In this regard, the Raman spectrum for the multi-walled CNTs having at least three walls would not have the RBM.

The CNTs preferably have a G/D ratio ranging from 1 to 20, because such CNTs would provide superior electrical conductivity even when the CNTs are blended in the rubber composition in a small amount. The preferred average length of the CNT structure when synthesized is in the range of 100 to 5000 μm. By using the CNTs having the average CNT structure length of 100 to 5000 μm when synthesized, more superior electrical conductivity would be observed in the rubber composition to be obtained, even if the CNTs are blended in a small amount. The average length of the CNTs is obtained by measuring the lengths of 100 randomly-selected CNTs using a transmission electron microscope.

The CNTs as described above can be obtained for example by a super growth method which will be described later.

The preferred specific surface area of the CNTs is 600 $m^2/g$ or more, more preferably 800 $m^2/g$ or more, but preferably 2500 $m^2/g$ or less, more preferably 1200 $m^2/g$ or less. When CNTs are mostly opened, the preferred specific surface area is 1300 $m^2/g$ or more.

The specific surface area of carbon nanotubes can be calculated by a BET method.

The preferred mass density of the CNTs is in the range of 0.002 $g/cm^3$ to 0.2 $g/cm^3$. If the mass density is 0.2 $g/cm^3$ or less, the binding between CNTs constituting the CNTs weakens, making it easier to uniformly disperse the CNTs when the CNTs are stirred in a solvent or the like. In other words, setting the mass density to be 0.2 $g/cm^3$ or less makes it easier to obtain a homogenous dispersion liquid of CNTs. If the mass density is 0.002 $g/cm^3$ or more, the unity of the CNTs improves, preventing the CNTs from becoming unbound and making the CNTs easier to handle.

The CNTs may be single-walled or multi-walled. However, to improve the electrical conductivity of the rubber composition manufactured with CNTs, CNTs having one to five walls are preferred, and CNTs having a single wall is more preferred.

The CNTs as used in the embodiments may be any CNTs that satisfy the relational expression $0.60>3\sigma/Av>0.20$. Of the CNTs, the carbon nanotubes obtained by a super growth method (hereinafter referred to as "SGCNTs") are preferred, which are described in Japanese Patent Nos. 4,621,896 (corresponding to EP1787955 A) and 4,811,712 (corresponding to US2009/0297846 A), the disclosure of which is incorporated herein by reference. Of the SGCNTs, carbon nanotubes having a specific surface area of 600 $m^2/g$ or more are further preferred, which effectively reform the rubber composition.

[Blending Amount of CNTs]

The amount of the CNTs (B) used in the rubber composition of the embodiments is generally in the range of 0.01 to 10 parts by mass, preferably in the range of 0.1 to 7 parts by mass, and more preferably in the range of 0.25 to 5 parts by mass, per 100 pars by mass of nitrile rubber (A). If the amount of the CNTs (B) contained in the rubber composition is too small, electrical conductivity would not be ensured. Conversely, when the amount of the CNTs (B) is in excess, fluidity and flexibility of the rubber composition is reduced, which deteriorates formability.

<Plasticizer>

The plasticizer optionally blended into the rubber composition of the embodiments may be any existing plasticizer, such as dibutoxyethyl adipate, dibutoxyethyl azelate, and dicyclohexyl phthalate. By blending the plasticizer, the hardness of the rubber composition can be adjusted.

The amount of the plasticizer used in the rubber composition is generally in the range of 0.1 to 200 parts by mass, preferably in the range of 1 to 150 parts by mass, more preferably in the range of 2 to 100 parts by mass, per 100 parts by mass of nitrile rubber (A). If the amount of the plasticizer in the rubber composition is too small, an increase in the brittle temperature is not suppressed. Conversely, if the amount is in excess, the plasticizer tends to bleed.

<Crosslinking Agent>

The rubber composition of the embodiments preferably further contains a crosslinking agent to provide, for example, formability and mechanical strength of the moldings.

The crosslinking agent used as necessary may be any crosslinking agent that is commonly used as a crosslinking agent of nitrile group-containing copolymer rubber. Typical examples of the crosslinking agent include a sulfuric crosslinking agent and an organic peroxide crosslinking agent that crosslink unsaturated bonds in the nitrile rubber (A). Of the crosslinking agents, the sulfuric crosslinking agent is preferred.

Examples of the sulfuric crosslinking agent include sulfur, such as powdered sulfur, flowers of sulfur, precipitated sulfur, colloidal sulfur, surface-treated sulfur, and insoluble sulfur; sulfur-containing compounds, such as sulfur chloride, sulfur dichloride, morpholine disulfide, alkylphenol disulfide, dibenzothiazyl disulfide, N,N'-dithio-bis(hexahydro-2H-azepine-2), phosphorus-containing polysulfide, and polymeric polysulfide; and sulfur donor compounds, such as tetramethyl thiuram disulfide, selenium dimethyl dithiocarbamate, and 2-(4'-morphorinodithio)benzotiazole.

Examples of the organic peroxide crosslinking agent include dicumyl peroxide, cumene hydroperoxide, t-butyl cumyl peroxide, para-menthane hydroperoxide, di-t-butyl peroxide, 1,3-bis(t-butylperoxy isopropyl)benzene, 1,4-bis (t-butylperoxy isopropyl)benzene, 1,1-di-t-butylperoxy-3,3-trimethylcyclohexane, 4,4-bis-(t-butyl-peroxy)-n-butylvalerate, 2,5-dimethyl-2,5-di-t-butylperoxyhexane, 2,5-dimethyl-2,5-di-t-butylperoxyhexyne-3,1,1-di-t-butylperoxy-3,5,5-trimethylcyclohexane, p-chlorobenzoyl peroxide, t-butylperoxyisopropyl carbonate, and t-butylperoxy benzoate.

The preferred content of the crosslinking agent in the rubber composition is in the range of, but not limited to, 0.1 to 10 parts by mass, more preferably in the range of 0.2 to 5 parts by mass, per 100 parts by mass of nitrile rubber (A).

If the sulfuric crosslinking agent is used as the crosslinking agent, crosslinking aids such as zinc flower or stearic acid, or crosslinking promotors such as those that are based on guanidine, aldehyde-amine, aldehyde-ammonia, thiazole, sulfenamide, or thiourea may be used in combination with the sulfuric crosslinking agent. The preferred amounts of the crosslinking aid and the crosslinking promotor used are in the range of, but not limited to, 0.1 to 10 parts by mass, per 100 parts by mass of nitrile rubber (A).

If the organic peroxide crosslinking agent is used as the crosslinking agent, crosslinking aids such as polyfunctional compounds, including trimethylolpropane trimethacrylate, divinyl benzene, ethylene dimethacrylate, and triallyl isocyanurate, may be used in combination with the organic peroxide crosslinking agent. The preferred blending amount of the crosslinking aid is in the range of, but not limited to, 0.5 to 20 parts by mass per 100 parts by mass of nitrile copolymer rubber (A).

<Other Additives>

The rubber composition of the embodiments may further contain other additives to improve or maintain the characteristics of the molded product to be obtained using the rubber composition. Examples of the additives include an antioxidant, a heat stabilizer, a light stabilizer, a UV absorbent, a pigment, a coloring agent, a foaming agent, an antistatic agent, a flame retarder, a lubricant, a softener, a tackifier, a plasticizer, a mold release agent, a deodorant, a perfume, inorganic compounds (such as silica particles and alumina particles), and sheet-like inorganic compounds (such as sheet alumina and clay).

<Method of Preparing Rubber Composition>

The rubber composition of the embodiments may be manufactured by any method. The preferred method of manufacturing the rubber composition for example includes the steps of mixing the above-described solution or dispersion liquid (or latex) of nitrile rubber (A), the above-described carbon nanotubes (B), and the crosslinking agent or the like which may be blended as necessary; coagulating the solid content in the resulting mixture; and drying the coagulated material obtained by the coagulation of the solid content.

Specifically, the rubber composition may be prepared by one of the following methods:

(1) adding CNTs (B) to the solution prepared by dissolving nitrile rubber (A) in an organic solvent, dispersing the CNTs by a dispersing treatment, coagulating the obtained liquid into crumbs, and drying the resultant to obtain the rubber composition;

(2) adding a dispersion liquid of CNTs (B), which has been previously prepared by dispersing the CNTs (B) in a solvent, to a solution prepared by dissolving nitrile rubber (A) in an organic solvent, coagulating the obtained liquid into crumbs, and drying the resultant to obtain the rubber composition; and (3) adding a water dispersion liquid of CNTs (B), which has been previously prepared by dispersing CNTs (B) in water, to latex prepared by dispersing nitrile rubber (A) in water, coagulating the obtained liquid into crumbs, and drying the resultant to obtain the rubber composition.

Of these methods, considering the characteristics of the rubber composition to be obtained, the method (3), which uses latex of nitrile rubber (A), is preferred. In the following, a method of preparing a rubber composition using latex will be described by way of example.

[Method of Preparing Rubber Composition with Latex]

-Mixing Step-

The latex of the nitrile rubber (A) to be used here may be the latex obtained by the above-described emulsion polymerization.

The water dispersion liquid of CNTs (B) may be obtained by adding the CNTs (B) to a dispersant water solution, in which a dispersant is dissolved, and treating the resulting solution with a dispersion method that provides cavitation effects.

The dispersant may be a surfactant or a polysaccharide. Considering the dispersibility of CNTs (B), a surfactant is more preferred, and an anionic surfactant is further preferred.

To achieve dispersion, the dispersion method providing the cavitation effects utilizes a shock wave caused by the rupture of vacuum bubbles formed in water. The rapture occurs when high energy is applied to the liquid. This dispersion method allows dispersion of the CNTs into the water without damaging the characteristics of the CNTs. Specific examples of the dispersion process providing cavitation effects include those performed using ultrasonic waves, a jet mill, and high-shear stirring. These dispersion processes may be performed alone or in combination. Preferred examples of the machines used in the dispersion process include an ultrasonic wave homogenizer, a jet mill, and high-shear stirring apparatus. These machines are conventionally and publicly known. If the CNTs (B) are dispersed with a ball mill or the like, the CNTs (B) may not be sufficiently dispersed. The above-described dispersion processes are thus preferred.

The latex of nitrile rubber (A) and the water dispersion liquid of CNTs (B) may be mixed by any stirring method that can uniformly mix the latex of nitrile rubber (A) and the water dispersion liquid (C) of CNTs (B).

If a plasticizer is blended into the rubber composition, such a plasticizer may be added and mixed to the above latex composition in the form of aqueous emulsion. In this manner, the nitrile rubber (A), the CNTs (B), and the plasticizer are uniformly mixed in the microstructure, so that the bleeding of the plasticizer occurs less frequently and the rubber composition with superior characteristics can be readily obtained.

The aqueous emulsion of the plasticizer may be prepared by any method. However, the emulsion is preferably prepared by adding the plasticizer to a water medium containing a surfactant in an amount of 0.5 to 10% by mass of the blending amount of the plasticizer, while vigorously stirring the solution. Examples of the surfactant include an anionic surfactant, such as potassium rosinate, sodium lauryl sulfate, potassium oleate, and sodium dodecylbenzenesulfonate; a nonionic surfactant, such as polyoxyethylene alkyl ether, polyoxyethylene alkyl ester, and polyoxyethylene sorbitan alkyl ester; and a cationic surfactant, such as didecyldimethyl ammonium chloride, and stearyl trimethyl ammonium chloride. The preferred concentration of the plasticizer in the aqueous emulsion is 5 to 70% by mass.

If a thermoplastic resin is blended in the rubber composition, a thermoplastic resin in the form of latex, which is produced by emulsion polymerization method conventionally and publicly known, may be mixed (or latex-blended) into the latex composition containing the CNTs (B) prepared as above.

-Coagulation Step-

The mixture obtained in the mixing step may be coagulated into crumbs by any method. For example, the coagulation of the mixture may be performed by:

(i) adding the mixture obtained in the mixing step to a water-soluble organic solvent;
(ii) adding an acid to the mixture;
(iii) adding a salt to the mixture; or
(iv) adding the mixture to an aqueous solution containing a coagulant.

Of the methods, adding the mixture (i.e., latex composition) to an aqueous solution containing a coagulant is preferred to salt-out and coagulate the mixture.

Examples of the coagulant include calcium chloride, sodium chloride, calcium hydroxide, aluminum sulfate, and aluminum hydroxide. The preferred amount of the coagulant used is in the range of 0.5 to 150 parts by mass, and particularly preferably in the range of 0.5 to 20 parts by mass, per 100 parts by mass of the nitrile rubber (A).

If the nitrile rubber (A) containing a cationic monomer unit is used, it is preferred that a solution of dilute sulfuric acid or the like be added to salt-out the latex composition, in order to adjust the pH of the coagulant solution to the pH equal to or less than the isoelectric point of the latex composition of the nitrile rubber (A). By adjusting the pH of the coagulant solution, the zeta-potential of the functional group in the cationic monomer unit contained in the nitrile rubber (A) is increased, which improves dispersibility of the CNTs (B) and increases the particle size of the crumbs obtained by coagulation.

The particle size of the crumbs obtained by coagulation largely affects the degree of dehydration, collection rate, and dryness of the crumb. The preferred average particle size of the crumbs is 0.5 to 40 mm.

-Drying Step-

The crumbs obtained by the coagulation step is cleaned, dehydrated and dried in the same manner as typical rubber products.

In the cleaning and dehydration, the crumbs may be separated from the solution with a net filter, a centrifuge, or the like and then cleaned. Thereafter, the crumbs as cleaned are dehydrated with a shaker screen, squeezer, or the like.

In the drying, the crumbs may be dried with a band dryer, a vertical through-dryer, a single-screw extruder, or a twin-screw extruder, which is commonly used in manufacture of rubber. By drying the crumbs until it reaches the desired water content, the rubber composition of the embodiments is obtained.

If the twin-screw extruder is used, the crumbs may be coagulated and dried in the twin-screw extruder simultaneously.

The rubber composition, obtained by coagulating the latex composition (which may contain a plasticizer, vinyl chloride resin, acrylic resin, etc.) into crumbs and drying the crumbs, may further contain other components such as an antioxidant and a reinforcing agent as necessary. The antioxidant or the reinforcing agent may be added to the rubber composition by kneading them with a kneading machine, such as a roll kneader and a Banbury mixer.

The rubber composition of the embodiments may be prepared by a different method from the one described above. For example, the rubber composition may be prepared by incorporating CNTs (B) as well as all of the components that may be added as necessary (e.g., a plasticizer, vinyl chloride resin, or acrylic resin) or the total or part of at least one of such components into the latex of the nitrile rubber (A); coagulating and drying the obtained rubber; and adding the remainder of the above components to the rubber together with another components that may be added as necessary (e.g., a filler other than the CNTs (B), an antioxidant, or a reinforcing agent) and kneading them using a kneading machine such as a roll kneader and a Banbury mixer.

(Molded Product)

The molded product of the embodiments is obtained by molding the above-described rubber composition. The molded product using the rubber composition may be molded by any method. Specifically, the molded product may be obtained by shaping the rubber composition using a forming machine suited to the shape of a desired molded item, and optionally crosslinking the molded item to fix the shape thereof as necessary. Examples of the forming machine include an extruder, an injection molder, a compressor, and a roller.

The crosslinking may be performed after or during the molding. The preferred molding temperature is in the range of 10 to 200° C., more preferably in the range of 25 to 120° C. The preferred crosslinking temperature is in the range of 100 to 200° C., more preferably in the range of 130 to 190° C., and particularly preferably in the range of 140 to 180° C. The preferred crosslinking time is in the range of 1 minute to 5 hours, and more preferably in the range of 2 minutes to 1 hour.

Depending on the shape, dimension, and the like of the molded material, even if the material is crosslinked on its surface, it may not be thoroughly crosslinked inside. In such a case, secondary crosslinking may be performed.

EXAMPLES

The following describes the rubber composition and molded product in detail with reference to examples, yet the disclosure are not limited to these examples. Note that below, "%" and "part" that represent amounts are mass standards, unless otherwise noted.

In the examples including the comparative examples, electrical conductivity and surface friction resistance were evaluated with the following methods.

[Electrical Conductivity]

The electrical conductivity of the rubber composition was measured in the following manner in accordance with JIS K7194, using a low-resistivity meter "Loresta®-GP MCP-T610", which is manufactured by Mitsubishi Chemical Analytech, Co., Ltd.

First, 450 mg of a sample, placed under vacuum, was vacuum-pressed at a temperature of 120° C. under a pressure of 0.4 MPa for a pressing time of 5 minutes. The sample was molded into a thin circular shape with a diameter of about 40 to 60 mm ϕ and a thickness of 100 to 500 μm. Four test pieces of a square shape with a dimension of 10 mm by 10 mm were then cut out from the molded sample as sample pieces of the measurement. A PSP probe was selected for the 4-terminal probe of the low-resistivity meter. The sample pieces were secured to an insulating board. The probe was pressed to the center portion of each sample piece (i.e., the position 5 mm in height and width from the sides of the sample piece) and a voltage of up to 90 V was applied to measure the electrical conductivity.

Electrical conductivity was randomly measured at 50 locations in total on the four sample pieces. The average and the standard deviation thereof were measured.

[Surface Friction Resistance]

The surface friction resistance of the rubber composition was measured in the following manner, using a HEIDON surface property tester "HEIDON®-14D", which is manufactured by SHINTO Scientific Co., Ltd.

Under vacuum, a sample was vacuum-pressed at a temperature of 120° C. under a pressure of 0.4 MPa for a pressing time of 5 minutes. The sample was molded into a thin circular shape with a diameter of about 40 to 60 mm ϕ and a thickness of 2 mm. Four test pieces of a rectangular shape with a dimension of 40 mm by 10 mm were then cut out from the molded sample as sample pieces of the measurement. The sheet-type sample pieces were moved horizontally under a test weight of 200 g (normal load N) at a test rate of 50 mm/min, and the friction force F (unit: gf) applied to the dynamic strain amplifier of the HEIDON surface property tester was measured using a ball indenter (SUSϕ10) as a measuring tool. A coefficient of friction μ was then calculated in accordance with the expression below:

$$\mu = F/N$$

In the examples, the value of the coefficient of friction μ was continuously recorded from when the sheet-type sample pieces are in a resting state to when the sample pieces reaches the test rate and maintains the rate. The maximum value of the coefficient of friction μ was determined as a coefficient of static friction, and the value obtained when the coefficient of friction μ becomes constant was determined as a coefficient of dynamic friction. The smaller the coefficients of static and dynamic frictions, the lower the surface friction resistance, which means superior sliding characteristics. In the examples, when both of the coefficients of static and dynamic frictions are less than 1.5, the friction resistance is rated "good"; when one of them is less than 1.5 but the other is 1.5 or greater, it is rated "fair"; and when both of them are 1.5 or greater, it is rated "poor".

Manufacturing Example 1

Synthesis of Carbon Nanotubes]

Using the super growth method described in Japanese Patent No. 4,621,896, carbon nanotubes were obtained.

Specifically, SGCNTs-1 were grown on the following conditions:

Carbon compound: ethylene (feeding rate: 50 sccm)

Atmosphere (gas): mixed gas of helium and hydrogen (feeding rate: 1000 sccm)

Pressure: 1 atmospheric pressure

Amount of water vapor added: 300 ppm

Reaction temperature: 750° C.

Reaction time: 10 minutes

Metal catalyst (amount of presence): iron thin film (thickness: 1 nm)

Substrate: silicon wafer

The resulting SGCNTs-1 have a BET specific surface area of 1,050 $m^2/g$. In the measurement using the Raman spectrophotometer, a spectrum of a radial breathing mode (RBM) was observed in a low-wavenumber domain of 100 to 300 $cm^{-1}$, which is characteristic of single-walled CNTs. The diameters of randomly-selected 100 SGCNTs-1 were also measured using a transmission electron microscope. The results of the measurements demonstrated that the average diameter (Av) was 3.3 nm, the diameter distribution (3σ) was 1.9 nm, and (3σ/Av) was 0.58.

Manufacturing Example 2

Synthesis of Carbon Nanotubes

Other than using a 5 nm-thickness iron thin film as the metal catalyst of the manufacturing example 1, the same procedure was followed to obtain SGCNTs-2. The resulting SGCNTs-2 has a BET specific surface area of 620 $m^2/g$. In the measurement using the Raman spectrophotometer, a spectrum of a radial breathing mode (RBM) was observed in a low-wavenumber domain of 100 to 300 $cm^{-1}$, which is characteristic of single-walled CNTs. The diameters of randomly-selected 100 SGCNTs-2 were also measured using a transmission electron microscope. The results of the measurements demonstrated that the average diameter (Av) was 5.9 nm, the diameter distribution (3σ) was 3.3 nm, and (3σ/Av) was 0.56.

Example 1

To 95 g of methyl ethyl ketone, 5 g of hydrogenated nitrile rubber having an acrylonitrile amount of 49.2% and an iodine value of 23 (product name: "Zetpol®0020" manufactured by Zeon Corporation) was added. The mixture was stirred at 25° C. for more than 24 hours, and 100 g of 5% rubber solution was obtained.

Then 2.5 mg of SGCNTs-1, which had been prepared in the manufacturing example 1, and 5 g of the 5% rubber solution were placed in a 20 cc screw vial and stirred at 25° C. for more than 1 hour to preliminarily disperse the CNTs.

Subsequently, using the ultrasonic cleaner "5510J-DTH" manufactured by BRANSON, the whole screw vital was subjected to a ultrasonic treatment with a power output of 180 W at a temperature of 10 to 40° C. for 1 hour, and SGCNTs-1 were dispersed in the 5% rubber solution.

n-Hexane and a stirrer were placed in a beaker to prepare n-hexane, which is in a stirred state. To this, the mixed solution of SGCNTs-1/rubber as prepared was gradually added to be coagulated into crumbs of SGCNT-1/rubber composition in n-hexane.

Thereafter, the SGCNTs-1/rubber composition was taken out from the n-hexane using suction filtration and was vacuum-dried at 40° C. for more than 24 hours in a vacuum dryer. A rubber composition 1 of SGCNTs-1 (1 part)/rubber (100 parts) was in this manner obtained. The rubber composition 1 was molded into a thin circular disk. The molded product was a flexible rubbery material, and the average electrical conductivity of the product was 0.08 S/cm and the standard deviation was 0.035 S/cm. The frictional resistance of the rubber composition 1 was rated "good". The results are collectively shown in Table 1.

Example 2

To 90 mL of 1% by mass sodium dodecyl sulfate solution, 90 mg of SGCNTs-2 prepared in the manufacturing example 2 was added. Using the thin-film spin disperser "FILMIX Model 56-50" manufactured by PRIMIX, the mixture was intermittently dispersed at a linear velocity of 50 m/s and a temperature of 30 to 60° C., until the aggregate of the SGCNTs-2 disappears. A SGCNTs-2 dispersion liquid 1 containing 0.1% by mass SGCNTs-2 was in this manner obtained.

To 90 g of methyl ethyl ketone, 10 g of hydrogenated nitrile rubber having an acrylonitrile amount of 36.2% and an iodine value of 56 (product name: "Zetpol 2030L", manufactured by Zeon Corporation) was added. The mixture was stirred at 25° C. for more than 24 hours, and 100 g of 10% rubber solution was obtained. To 75 mL of 1% by mass sodium dodecyl sulfate solution, 15 g of the 10% rubber solution was added. Using the thin-film spin disperser "FILMIX Model 56-50" manufactured by PRIMIX, the mixtures was emulsified at a linear velocity of 30 m/s and a temperature of 30 to 60° C. for 20 minutes. A rubber emulsion liquid was in this manner obtained. The solid content concentration of the rubber emulsion liquid obtained was measured from the heating residue, and was 1.7% by mass.

Then 15 g of the rubber emulsion liquid as prepared and 0.127 g of SGCNTs-2 dispersion liquid 1 were mixed and stirred for 2 hours, and a mixed solution of SGCNTs-2/rubber was obtained.

2-Propanl and a stirrer are placed in a beaker to prepare 2-propanol, which is in a stirred state. To this, the mixed solution of SGCNTs-2/rubber as prepared was gradually added to be coagulated into crumbs of SGCNTs-2/rubber composition in 2-propanol.

Thereafter the SGCNTs-2/rubber composition was taken out from the 2-propanol using suction filtration and vacuum-dried at 40° C. for more than 24 hours in a vacuum dryer. A rubber composition 2 of SGCNTs-2 (0.05 parts)/rubber (100 parts) was in this manner obtained. The rubber composition 2 was molded into a thin circular disk. The molded product was a flexible rubbery material, and the average electrical conductivity of the product was 0.002 S/cm and the standard deviation was 0.002 S/cm. The frictional resistance of the rubber composition 2 was rated "fair". The results are collectively shown in Table 1.

Example 3

To 90 mL of 1% by mass sodium dodecyl sulfate solution, 90 mg of SGCNTs-2 prepared in the manufacturing example 2 was added. Using the jet mill "JN-20" manufactured by JOKOH, the mixtures was treated 20 times to obtain a SGCNTs-2 dispersion liquid 2 containing SGCNTs-2 in an amount of 0.1% by mass.

Other than changing the hydrogenated nitrile rubber used in Example 2 to a hydrogenated nitrile rubber having an acrylonitrile amount of 18.6% and an iodine value of 7 or less (product name: "Zetpol 4300" manufactured by Zeon Corporation), and mixing 15 g of the rubber emulsion as prepared and 25.5 g of SGCNTs-2 dispersion liquid 2, the procedure of Example 2 was followed to obtain a rubber composition 3 of SGCNTs-2 (10 parts)/rubber (100 parts). The rubber composition 3 was molded into a thin circular disk. The molded product was a flexible rubbery material, and the average electrical conductivity of the product was 4.2 S/cm and the standard deviation was 0.14 S/cm. The frictional resistance of the rubber composition 3 was rated "good". The results are collectively shown in Table 1.

Example 4

Other than changing the carbon nanotubes from SGCNTs-2 to multi-walled carbon nanotubes (MWCNTs) "NC7000", having a BET specific surface area of 290 $m^2/g$ and manufactured by Nanocyl, the procedure of Example 3 was followed to obtain a MWCNTs dispersion liquid free of aggregate. The diameters of randomly-selected 100 "NC7000" CNTs were measured using a transmission electron microscope. The results of the measurements demonstrated that the average diameter (Av) was 9.3 nm, the diameter distribution ($3\sigma$) was 2.6 nm, and ($3\sigma$/Av) was 0.28.

Other than changing the SGCNTs-2 dispersion liquid 2 of Example 3 to the MWCNTs dispersion liquid, the procedure of Example 3 was followed to obtain a rubber composition 4 of NC7000 (10 parts)/rubber (100 parts). The rubber composition 4 was molded into a thin circular disk. The molded product was a flexible rubbery material, and the average electrical conductivity of the product was 0.01 S/cm and the standard deviation was 0.039 S/cm. The frictional resistance of the rubber composition 4 was rated "good". The results are collectively shown in Table 1.

Comparative Example 1

Other than changing the CNT used in Example 1 from SGCNTs-1 to HiPCO, which is manufactured by Nanolntegris Inc. and having a BET specific surface area of 700 $m^2/g$, the procedure of Example 1 was followed to obtaine a comparative example rubber composition 1 of CNTs (1 part)/rubber (100 parts). The diameters of randomly-selected 100 "HiPCO" CNTs were measured using a transmission electron microscope. The results of the measurements demonstrated that the average diameter (Av) was 1.1 nm, the diameter distribution ($3\sigma$) was 0.2 nm, and ($3\sigma$/Av) was 0.18. The comparative example rubber composition 1 was molded into a thin circular disk. The molded product was a flexible rubbery material, but the electrical conductivity of the product was below the lower limit of measurement. The frictional resistance of the comparative example rubber composition 1 was rated "poor". The results are collectively shown in Table 1.

TABLE 1

| | | Ex. 1 | Ex. 2 | Ex. 3 | Ex. 4 | Com. Ex. 1 |
|---|---|---|---|---|---|---|
| Nitrile rubber | Content of α,β-ethylenic unsaturated nitrile monomer unit [% by mass] | 49.2 | 36.2 | 18.6 | 18.6 | 49.2 |
| | Iodine value [—] | 23 | 56 | 7 or lower | 7 or lower | 23 |
| Carbon nanotubes | Type | SGCNT-1 | SGCNT-2 | SGCNT-2 | NC7000 | HiPCO |
| | Average diameter (Av) [nm] | 3.3 | 5.9 | 5.9 | 9.3 | 1.1 |
| | Diameter distribution (3σ) [nm] | 1.9 | 3.3 | 3.3 | 2.6 | 0.2 |
| | 3σ/Av [—] | 0.58 | 0.56 | 0.56 | 0.28 | 0.18 |
| | BET specific surface area [$m^2/g$] | 1050 | 620 | 620 | 290 | 700 |
| | Blended amount per 100 pts. by mass nitrile rubber [pts. by mass] | 1 | 0.05 | 10 | 10 | 1 |
| Evaluation | Average electrical conductivity [S/cm] | 0.08 | 0.002 | 4.2 | 0.01 | — |
| | Standard deviation of electrical conductivity [S/cm] | 0.035 | 0.002 | 0.14 | 0.039 | — |
| | Frictional resistance | good | fair | good | good | poor |

The results demonstrate that a rubber composition that contains nitrile rubber (A) having an α,β-ethylenic unsaturated nitrile monomer unit and an iodine value of 100 or lower, and carbon nanotubes (B) having the average diameter (Av) and the diameter distribution (3σ) that satisfy 0.60>3σ/Av>0.20 exhibits superior electrical conductivity and low surface friction resistance.

The invention claimed is:

1. A rubber composition, comprising:

nitrile rubber (A) having an α,β-ethylenic unsaturated nitrile monomer unit and an iodine value of 100 or lower; and carbon nanotubes (B) having an average diameter (Av) and diameter distribution (3σ) that satisfy the following relational expression: 0.60>3σ/Av>0.20, wherein the amount of the carbon nanotubes (B) per 100 parts by mass of the nitrile rubber (A) is 0.01 to 10 parts by mass, and the specific surface area of the carbon nanotubes (B) is 600 $m^2/g$ or more.

2. The rubber composition according to claim 1, wherein the content of the α,β-ethylenic unsaturated nitrile monomer unit in the nitrile rubber (A) is 15 to 60% by mass of total monomer units.

3. A molded product made of the rubber composition according to claim 1.

* * * * *